United States Patent
Maucksch et al.

(10) Patent No.: US 7,146,289 B2
(45) Date of Patent: Dec. 5, 2006

(54) TIME DELAY EVALUATION

(75) Inventors: Thomas Maucksch, Tuntenhausen (DE); Uwe Baeder, Ottobrunn (DE)

(73) Assignee: Rohde & Schwarz GmbH & Co. KG (DE)

( * ) Notice: Subject to any disclaimer, the term of this patent is extended or adjusted under 35 U.S.C. 154(b) by 145 days.

(21) Appl. No.: 10/486,742
(22) PCT Filed: Jul. 9, 2003
(86) PCT No.: PCT/EP03/07421

§ 371 (c)(1),
(2), (4) Date: Oct. 6, 2004

(87) PCT Pub. No.: WO2004/010619

PCT Pub. Date: Jan. 29, 2004

(65) Prior Publication Data

US 2005/0037714 A1    Feb. 17, 2005

(30) Foreign Application Priority Data

Jul. 19, 2002  (EP)  ............................ 02016106

(51) Int. Cl.
*G06F 15/00* (2006.01)
(52) U.S. Cl. ............... 702/181; 257/200; 348/192; 702/176; 702/178
(58) Field of Classification Search ....... 702/176–182; 370/328, 332, 331; 455/436, 503; 257/200; 348/192

See application file for complete search history.

(56) References Cited

U.S. PATENT DOCUMENTS

| 5,267,261 | A |   | 11/1993 | Blakeney, II et al. |
| 5,825,760 | A |   | 10/1998 | Siira |
| 5,912,701 | A | * | 6/1999  | Morton, Jr. ............... 348/192 |
| 6,178,334 | B1 |  | 1/2001  | Shyy et al. |
| 6,205,125 | B1 |  | 3/2001  | Proctor et al. |
| 2002/0072370 | A1 | | 6/2002 | Johansson et al. |
| 2003/0030071 | A1 | * | 2/2003 | Keim et al. ............... 257/200 |

* cited by examiner

*Primary Examiner*—Bryan Bui
*Assistant Examiner*—John H. Le
(74) *Attorney, Agent, or Firm*—Christensen O'Connor Johnson Kindness PLLC

(57) ABSTRACT

The invention concerns a method to evaluate whether a statistical time delay (TD) between a first event and a second event of a device under test is better than a test limit (TL). The method includes the steps: performing a minimum number N of tests and evaluating the time delay (TD) from each test; modeling a first probability distribution (P1) of the evaluated time delays (TD); obtaining a second probability distribution (P2) of the evaluated time delays (TD); performing a statistical transformation in order to obtain a third probability distribution (P3) of the evaluated time delays (TD); and deciding to pass the device under test, if a certain percentage of the area of the third probability distribution (P3) is on a good side (GS) of the test limit (TL2).

11 Claims, 6 Drawing Sheets

TIME DELAY EVALUATION

CROSS-REFERENCE TO RELATED APPLICATION

This application is the National Stage of International Application No. PCT/EP03/07421, filed Jul. 9, 2003.

BACKGROUND

The invention concerns a method to evaluate whether a time delay as a implementation dependent parameter is better than a statistically defined soft test limit. The invention is especially applied to a class of measurements measuring the delay time from a cell quality swap, generated by a system simulator, to the registration message, generated by the user equipment, a mobile station for example. In a mobile communication system the mobile station (user equipment) should make a cell reselection or handover to another base station of another communication cell if the quality of communication with the current base station of the current cell (cell quality) decreases and the communication quality with an other base station of an other cell increases over the quality of the current base station.

Such a soft handover handled by a mobile station in a communication system with several base stations for a mobile system of the third generation using Code Division Multiple Access (CDMA) is known from U.S. Pat. No. 5,267,261 for example.

The communication standard defines a maximum delay time (test limit) from the swap cell quality until the time where the user equipment issues a registration message in order to register to the other base station. However, this test limit is not defined as a hard limit, i. e. the user equipment would not fulfil the test requirement if the delay time exceeds the time limit only a single time, but is defined as a soft limit, i. e. the user equipment shall fulfil the test requirement for a certain percentage (for example 90%) of the cases in repeated measurements. The pass fail decision of the user equipment against the soft limit shall be done with a certain quality, for example 5% wrong decision risk.

From the present state of the art it is not known how to deal with such statistically defined soft limits for repeated tests.

It is the object of the present invention to provide an effective method to measure a parameter, especially time delay, against a statistically defined soft limit.

SUMMARY

A method to evaluate whether a statistical time delay (TD) between a first event (CS) and a second event (RM) of a device under test (DUT) is better than a test limit (TL) comprises the following steps: (a) performing a minimum number N of tests and evaluating the individual time delay (TD) from each test; (b) modeling a first probability distribution (P1) of the evaluated time delays (TD) as a function of the elapsed time from the first occurrence of the first event (CS) to the first occurrence of the second event (RM); (c) obtaining a second probability distribution (P2) of the evaluated time delays (TD) as a function of the elapsed time from the first occurrence of the first event (CS) to the N-th occurrence of the second event (RM) by performing the N−1-th self convolution of the first probability distribution (P1); performing a statistical transformation (ST) in order to obtain a third probability distribution (P3) of the evaluated time delays (TD) as a function of the N-th occurrence of the second event (RM); and (d) deciding to pass the device under test (DUT), if a certain percentage of the area of the third probability distribution (P3) is on a good side (GS) of the test limit (TL2), or deciding to fail the device under test (DUT), if a certain percentage of the area of the third probability distribution (P3) is on a bad side (BS) of the test limit (TL2), otherwise; (e) a repeating the steps of the method with an incremented number N of tests.

DESCRIPTION OF THE DRAWINGS

The invention is further described with respect to the drawings. In the drawings

DETAILED DESCRIPTION

Figure 1:
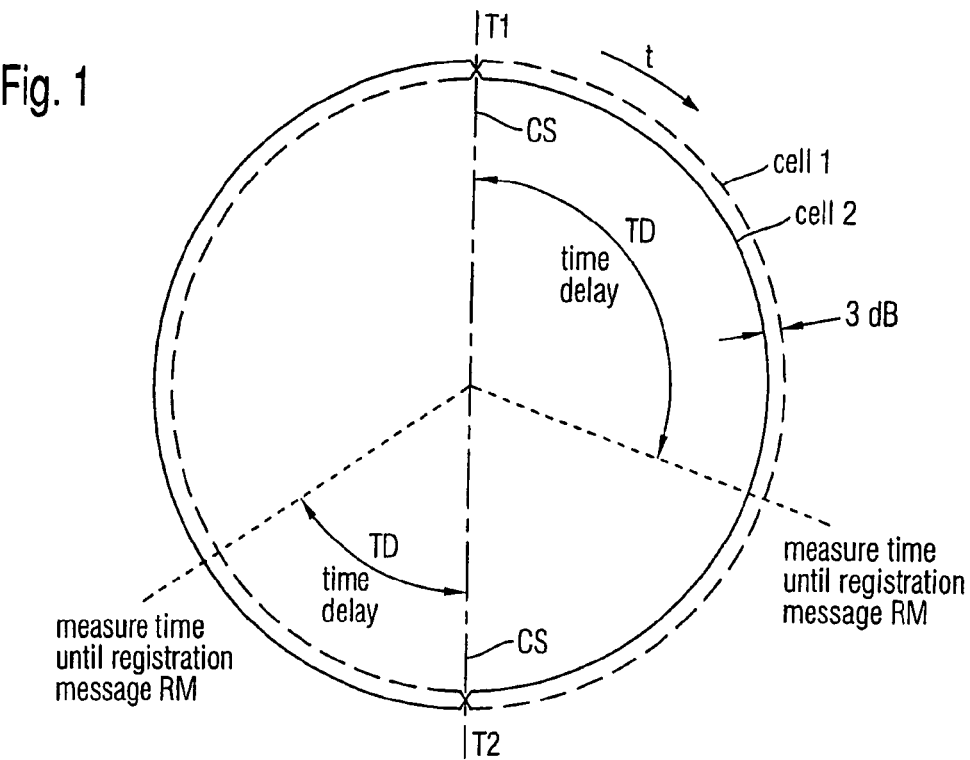
FIG. 1 shows the scenario of cell swap and measurement of delay time.

FIG. 1 shows the scenario of the swap and measurement of delay time. A system simulator simulates the two cells cell 1 and cell 2 of cellular mobile communication system. A User Equipment (mobile station) is registered to one of the cells of the cellular mobile communication system. The system simulator swaps the cell quality at specific cyclic time points T1 and T2. From time T1 until time T2 cell 1 has the better cell quality compared to cell 2. For example the field strength received by the User Equipment from cell 1 is 3 dB higher than received from cell 2. From T2 to T1 the cell quality of cell 2 is better as the cell quality of cell 1. The User Equipment should recognise the cell swap CS and should react to the cell swap CS by issuing a registration message RM. With the registration message RM the User Equipment registers to the cell serving with better cell quality. The User Equipment needs a specific time delay TD to evaluate and recognise the cell swap CS and to react thereon with the registration message RM. This time delay TD is measured for a specific number of tests. According to the inventive method it is evaluated whether the average time delay is better than a statistically defined test limit.

Figure 2:
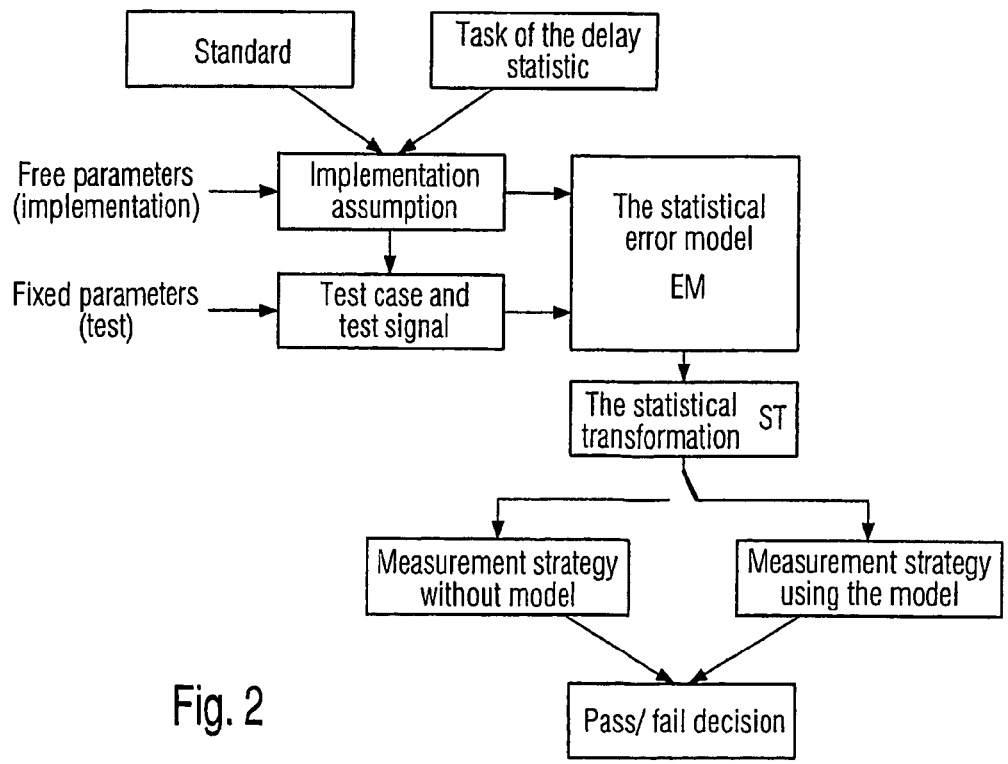
FIG. 2 shows an overview over the inventive method.

FIG. 2 shows a flow chart giving an overview over the inventive method. An implementation assumption is done on the basis of the telecommunication standard having free parameters. The test case and test signal have fixed parameters. The implementation assumption and the test case and test signal are the basis for a statistical error model EM. With a statistical transformation ST a pass/fail decision for the device under test DUT based on the measurements using the error model EM can be made.

Figure 3:
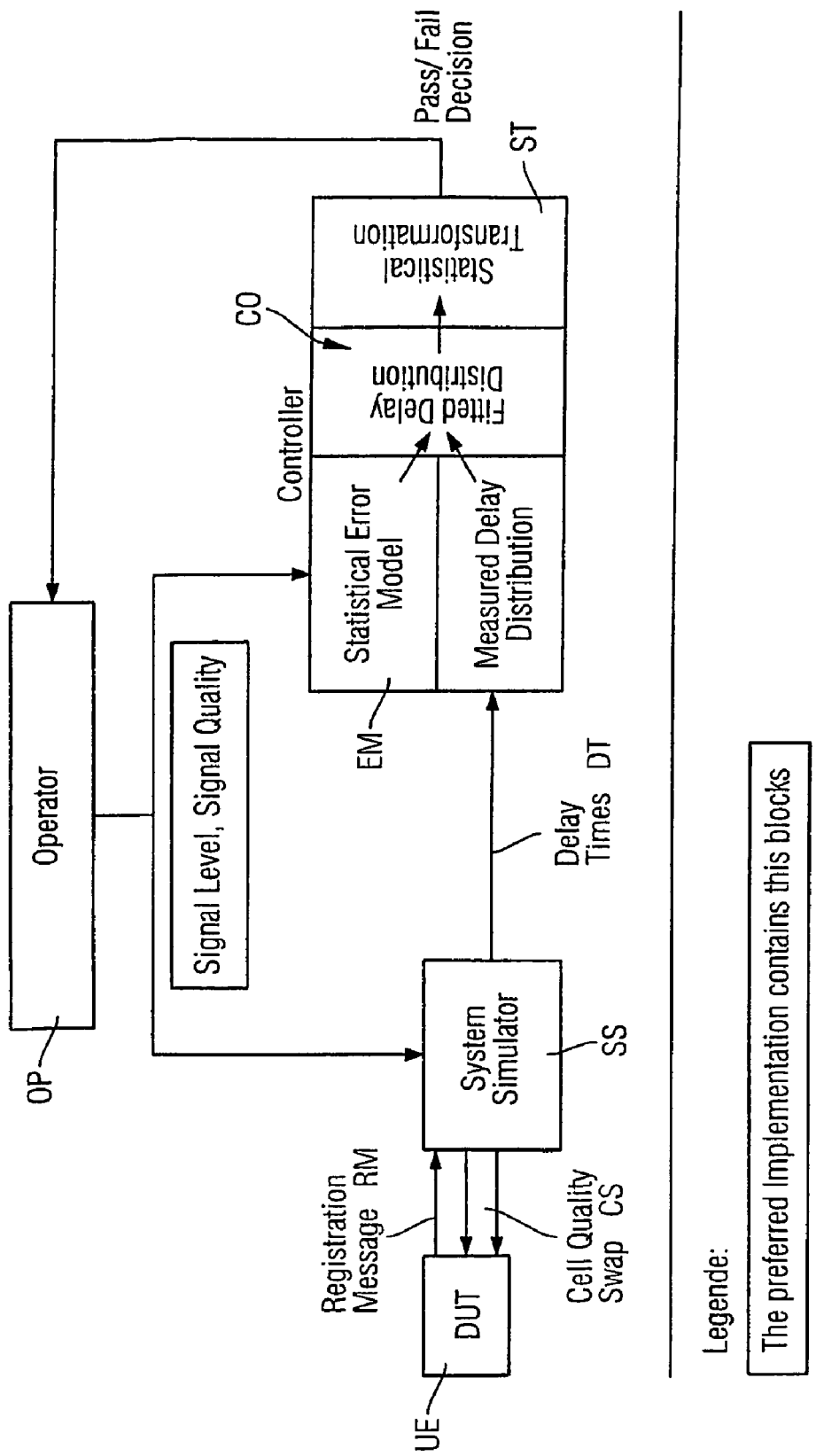
FIG. 3 shows a block diagram of the measurement set up.

FIG. 3 shows a block diagram of the measurement set up. A system simulator SS performs a cell quality swap CS at times T1 and T2 in FIG. 1. The User Equipment UE, which is the device under test DUT reacts thereon with a registration message RM after a delay time TD as shown in FIG. 1. The delay time TD is transferred to a controller CO. Controller CO generates a measured delay distribution and models a fitted delay distribution on the basis of a statistical error model EM. The model is fitted towards the measurement. The fitted delay distribution is a function of elapsed time. By a statistical transformation ST a probability distribution as a function of the N-th occurrence of the registration message RM can be generated as later described with respect to FIG. 6 to 8. An operator OP controls the signal level and signal quality of the signal generated by system simulator SS. The pass/fail decision is indicated to operator OP by the controller CO.

The result of the activities of the User Equipment UE shall be measured by the System Simulator SS. The test measures the delay time DT from a cell quality swap CS, generated by the System Simulator SS to the registration message RM, generated by the User Equipment UE. There is a test limit TL for the delay time DT. The delay time DT shall be <8 s for example. However this is not a hard limit. The limit shall be fulfilled in 90% of the cases in repeated measurements. The pass fail decision for the User Equipment UE against this soft limit shall be done with a certain quality, for example 5% wrong decision risk. This task is totally new for testing mobile systems.

In the following a summary of the inventive measurement strategy is given. The task is of statistical nature. Statistical tasks up to now (for example for BER BLER tests as described in earlier application PCT/EP02/02252) could be based on a well accepted distribution function, for example of Chi Square-nature, where just the parameter of the distribution is implementation dependent. This is not possible here because:

1. The distribution function must be developed in advance or during the test.
2. It can be foreseen, that the distribution function is not a classical one (Binomial. Gauss, Poisson . . . )
3. It can be foreseen, that the distribution function is implementation dependent, e. g. not only the parameter, even the nature is implementation dependent.

To solve the delay statistic task, 3 nearly independent sub-tasks are needed:

1) With a meaningful implementation assumption for the User Equipment UE with an error model EM for the User Equipment UE and by considering the specific test procedure and test signals, a model for activities inside the User Equipment UE is derived. Those activities measure the quality of several cells, process this information in order to detect the cell quality swap CS and finally generate the registration message RM. The model is described by parameters, some of them are free for variation.

From the model a time dependent probability, that the DUT's decision "register" occurs, is derived (see FIG. 5) The time dependency comes from the fact, that the activities inside the User Equipment UE are subject to a memory, because of a filter. From this, the differential probability distribution, that the registration event occurs after D seconds, can be derived with basic mathematical methods. D is the delay time, which is the measurable quantity, accessible from outside the User Equipment UE.

2) The delay time TD is repeatedly measured and establish a probability distribution of the delay times. The modelled distribution is fitted towards the measured distribution, using the above mentioned free parameters, and for the future the modelled and fitted distribution is used. This is a preliminary one and can tell, which percentage is below or above the limit TL of for example 8 s. However, if pass or fail is decided, a quality of that decision in terms of wrong decision risk is invisible. With mathematical methods the latest modelled and fitted distribution is transformed into another distribution, which directly shows the quality of the decision: The result of this statistical transformation ST is the probability to find 1, 2, . . . , N decisions in a given time, where the given time is the accumulation of measured and fitted delay time DT. This distribution allows a decision and in addition gives a quality of the decision.

If 95 % of the distribution is on the good side GS of the limit TL2, according to formula (3) (see later), the DUT is passed (5% wrong decision risk). If 95% of the distribution is on the bad side BS of the limit TL2, according to formula (3), the DUT is failed (5% wrong decision risk). Otherwise the test is continued.

3) The third task is to define a measurement strategy, using the result of step 2), to derive an early and reliable pass fail decision. This is 4fold:
  a) Grouping the measured delays into meaningful classes, such that a delay distribution becomes visible.
  b) Finding rules to fit the model to the measurement.
  c) Interpreting the distribution, derived in step 2), to derive pass fail decisions or otherwise continue the test.
  d) Embedding steps a) to c) into an recursive process, with the goal to find the decision after the minimum possible time.

It is the target of the invention to gain a pass/fail decision for the User Equipment UE based on the exceed-8 s-ratio of 10% in repeated delay tests. This pass fail decision shall be done with a certain quality, e.g 5% wrong decision risk. This decision shall be achieved after the minimum possible repetitions of delay tests.

The pass fail decision with e.g. 5% wrong decision risk can be made using the distribution of time delays TD. The distribution of time delays TD is an approximation and is generated by exploiting apriori information about the process causing the time delay TD (as much as possible) and by taking measurement samples of the time delay TD (as few as possible).

The approximation process needs a compromise as follows: Modelling the process, causing the time delay TD, as detailed as possible, needs many parameters. Fitting the model towards the measurement needs a number of measurements, a magnitude higher than the number of parameters, describing the model. So, in order to finalise the test after a few repetitions, it is necessary to describe the model with a few parameters and give away some fidelity of the distribution. At the end there are two components of uncertainty: Uncertainty that the used distribution is the correct one, and wrong decision risk based on the used distribution.

Figure 4:
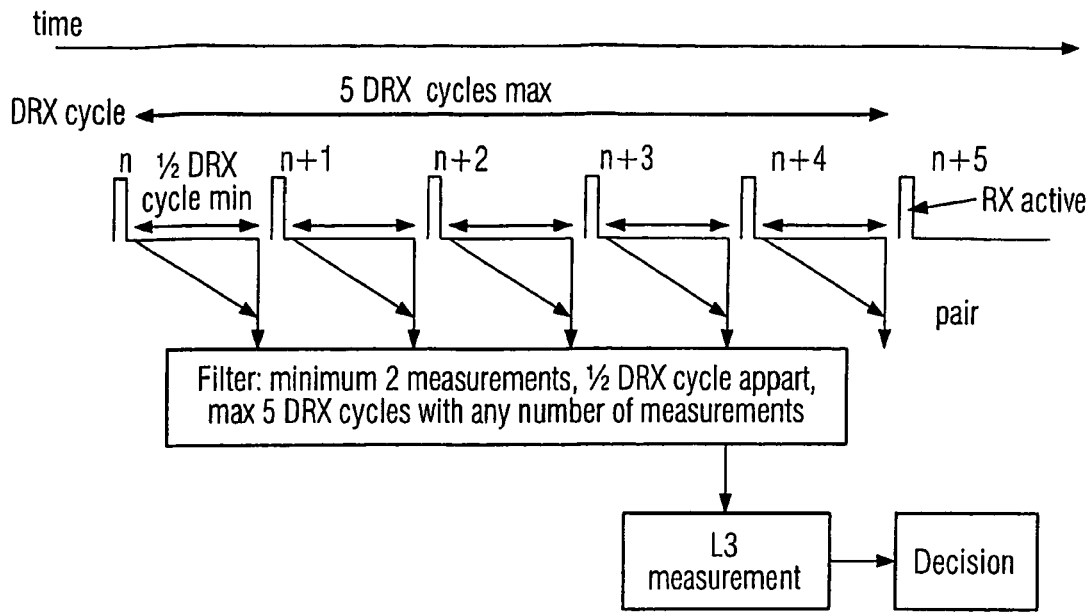
FIG. 4 shows the DRX-cycles of a user equipment.

An implementation of a model for the user equipment's activity can be seen in FIG. 4.

In the example shown in FIG. 4 the measurement can be combined from at least 2 physical measurements with a time distance >½ DRX (Discontinious Receiption) cycle up to arbitrary many physical measurements within 5 DRX cycles. During a DRX cycle a user equipment is only active at the beginning of the period as indicated by "RX active" in FIG. 4. The measurement gives results in discrete time instants from a gliding set of physical measurements for each cell under consideration. The measurements for the cells under consideration are compared, if a cell is e. g. 3 dB better than the current serving cell.

This implementation is part of the process, causing the time delay TD. It shall be described by a realistic structure and an appropriate number of parameters, high enough to model the process near to reality, and low enough to fit the model to a low number of measured samples. The preferred implementation is related to a filter which is characterised by an IIR (Infinite Impulse Response)—structure with one free parameter k. The User Equipment UE shall apply filtering of the measurements for that measurement quantity according to the following formula:

$$F_n = (1-a) \cdot F_{n-1} + a \cdot M_n \qquad (1)$$

The variables in the formula are defined as follows:
$F_n$ is the updated filtered measurement result
$F_{n-1}$ is the old filtered measurement result
$M_n$ is the latest received measurement result from physical layer measurements.
$a = \frac{1}{2}^{(k/2)}$, where k is a parameter.

Figure 11:
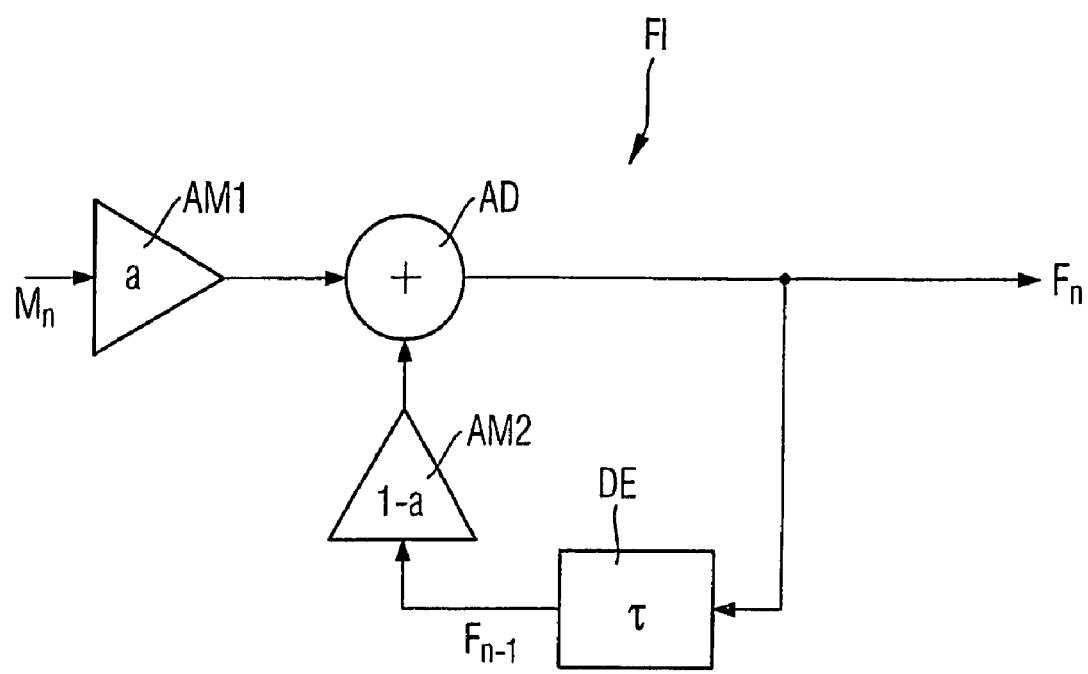

FIG. 11 shows a block diagram of the filter FI. The sampler of the measurement result Mn are transferred via a first amplifier AM1 with gain a to a first entrance of an adder AD. The samples of the filtered measurement result $F_n$ are transferred via a delay element DE with delay τ and a second amplifier AM2 with gain 1–a to a second entrance of the adder AD.

There are additional contributors to the process, causing the delay. There are several errors sources which randomise the delay: level errors (corrupting the comparison, 3 dB better or not) and delay impacts.

One delay impact is scheduling delay. Cell swap CS by the system simulator SS and the first physical measurement of the User Equipment UE are uncorrelated. This results in a random delay. It is modelled by a random equally distributed delay. The according differential distribution function is rectangular with the following property: Delay=1/Probab=S. This is a first free parameter S.

A second impact is the processing delay in the User Equipment UE. This results in a deterministic and/or random delay. The random part is modelled with S. The deterministic part is modelled with a constant processing delay PD. This is a second free parameter PD.

Level errors are caused by additional random. This is mainly the externally AWGN (Additive White Gaussian Noise)-channel, but internal receiver noise as well. It is modelled with a gaussian distribution and its standard deviation σ. This is a third free parameter σ.

Further level errors are caused by linear distortion. The measurement is subject to a memory in the User Equipment UE. The memory smoothes the random errors, however it distorts the measurement of the present physical measurement. This is harmless in a static situation but harmful as long as results from physical measurements before the cell swap CS are in the memory. The effect of this contribution is achieved by passing the signals through the assumed implementation. This is a fourth free parameter k.

Other level errors are caused by a linearity error. This is modelled with a deviation parameter. This is a fifth free parameter L. Wrongly measured signals or test signal levels apart from the defined ones or a shifted decision limit have related effects.

Offset and non-linear distortion could be considered but for simplicity and to save free parameters the preferred implementation will not.

In contrast to the delay impact, the level error impact causes Dirac shaped differential probabilities, time spaced with 1 DRX cycle, according to the implementation assumption.

The result of this consideration is a time dependent probability for a decision e. g. "3 dB better". This is achieved by convoluting the differential probabilities from the scheduling delay with the Diracs from the Level error impact and shifting all by the processing delay. This probability is low, shortly after the cell quality swap CS, then it increases. After the memory length of the filter it reaches a higher, constant probability.

The preferred implementation is based on the above 5 free parameters S, PD, σ, k and L. Consequently the minimum number of delay measurements must be approximately one magnitude higher. A minimum number of delay measurements of 25 is proposed.

Figure 5:
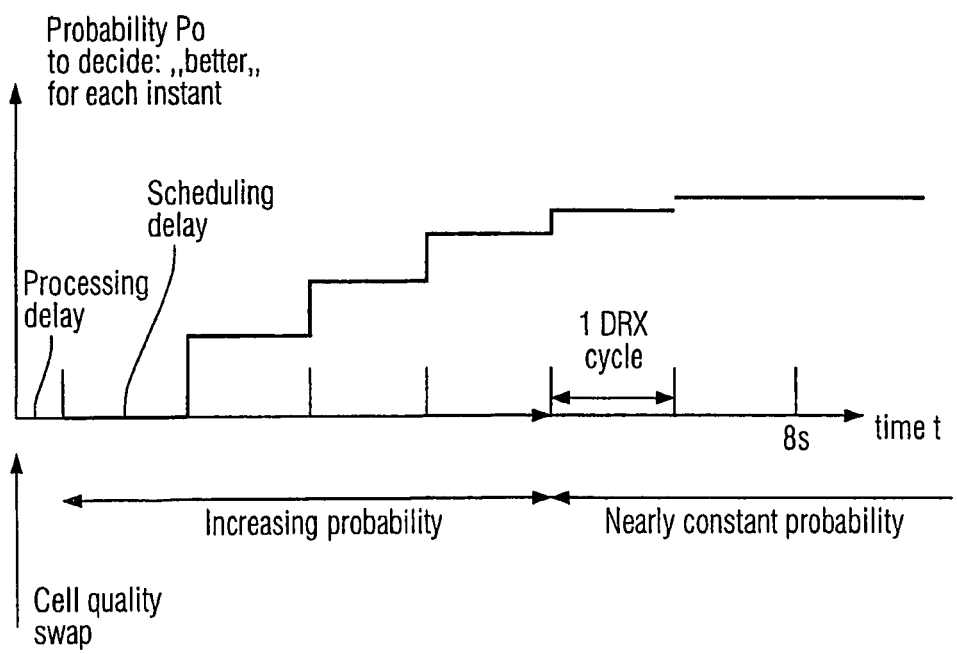
FIG. 5 shows the probability Po to decide "better" for each instant as a function of time.

The time dependent probability as shown in FIG. 5 is the most elementary statistical description of the problem. It is derived from a certain implementation assumption and the aggregate of several error processes. It indicates what the probability is for each moment to decide "register". It cannot be measured outside the User Equipment UE. However with formula (2) it can be transformed into a distribution, which is measurable: the time distribution from the cell swap CS to the decision "register" of the User Equipment UE and the issue of the registration message RM. This distribution can be established by measuring the time delay TD repeated times.

$$P1(T) = Po(T) * \prod_{t=0}^{t=T-1} (1 - Po(t)) \qquad (2)$$

P1 (T): Probability in FIG. 6, T=horizontal axis (time)
Po (t): Probability in FIG. 5, t=horizontal axis (time)
Resolution of time: e.g. 1DXR cycle As mentioned above it is proposed to fit the model towards the measurement and reuse the modelled and fitted distribution. The constant parameter is $1^{st}$ decision. The variable input is time to the $1^{st}$ decision. The output is the probability to find the $1^{st}$ decision at the questioned instant of time. The probability distribution P1 may have approximately the shape shown in FIG. 6.

Figure 6:
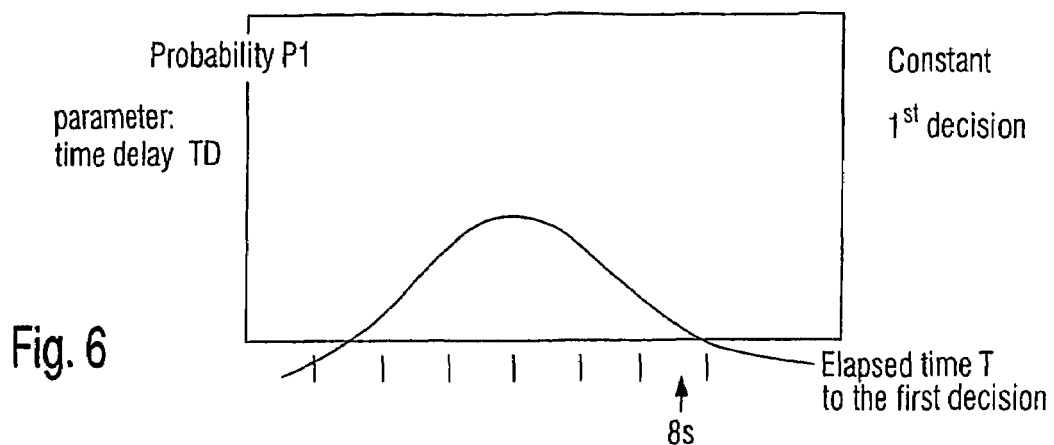
FIG. 6 shows the probability as a function of elapsed time to the first decision.
Figure 9:
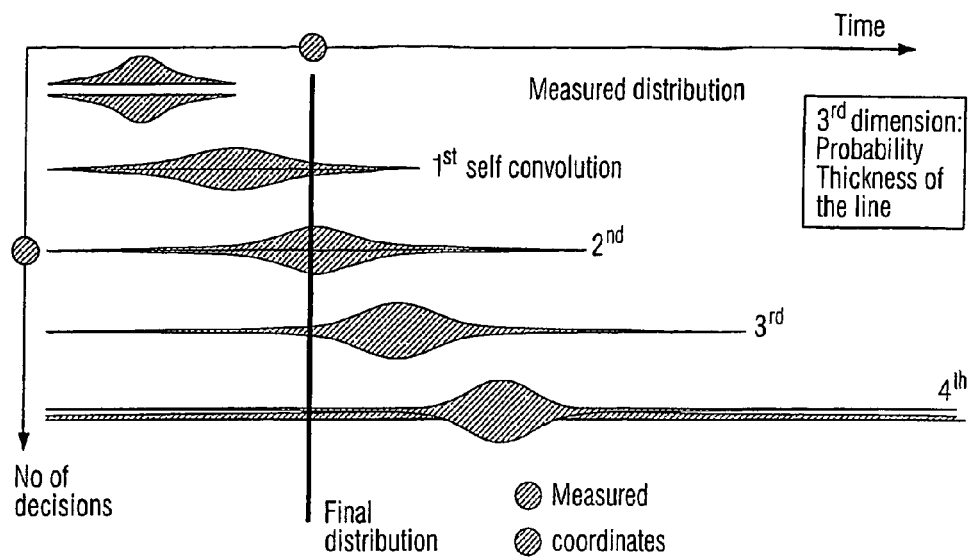
FIG. 9 shows the probability distribution and a number of convolutions of this probability distribution

This distribution can be confirmed by an increasing number of delay measurements and converges to a final shape by an infinite number of measurements. Entering the test limit (e. g. 8 s) into the distribution, the exceed-8 s-ratio can be seen. For a finite number of measurements it is a preliminary ratio. However, if it is decided based on this preliminary exceed-8 s-ratio, a wrong decision risk (confidence level) can not be stated. We proceed to a suitable distribution by another 2 step transformation:

$1^{st}$ step:

The probability distribution P1 shown in FIG. 6 gives statistically the time to the first decision "register". Now we ask for the time to the $N^{th}$ decision "register" and $N^{th}$ issue of the registration message RM. This is done by N–1 self-convolutions of the previous distribution. As with any self-convolution, the elapsed time increases by the factor of N. The bandwidth of the probability distribution P2 generated by the N–1 self-convolution increases absolutely, however relatively it decreases, see bold line in FIG. 7 and see FIG. 9. FIG. 9 shows the self convolutions for different number of decisions.

Figure 7:
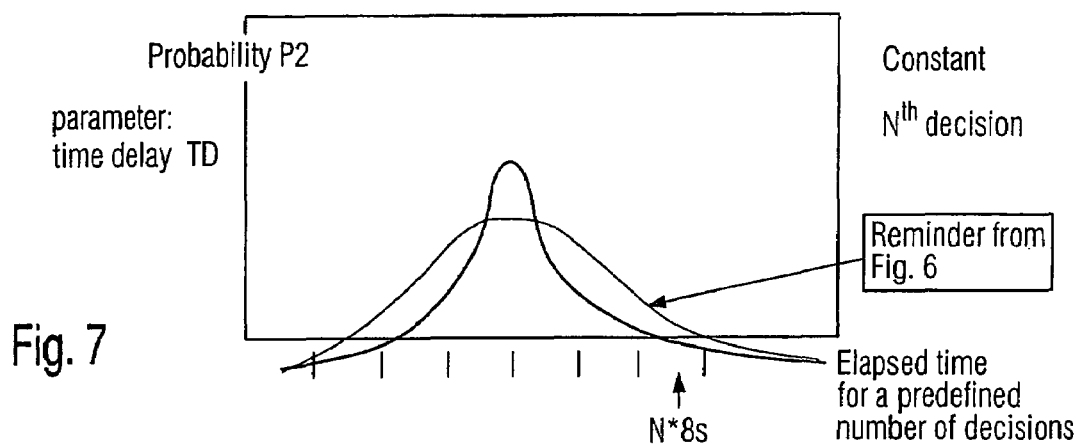
FIG. 7 shows the probability as a function of elapsed time for a predefined number of decisions.

The constant parameter of the probability distribution P2 shown in FIG. 7 is the number of decisions N. The variable input of the distribution is the time to the $1^{st}$, $2^{nd}$, $3^{rd}$, ..., $N^{th}$ decision. The output is the probability to find the $N^{th}$ decision at this instant of time.

2$^{nd}$ step:

Swapping constant parameter and variable, we proceed to our final distribution:

Given a certain time duration, what is the probability to get 1, 2, ..., N decisions? This reflects the measurement problem: We count the number of decisions or registration messages RM and we accumulate the time to that decision or message RM. We ask for the probability distribution P3 to find more or less decisions during that time.

Figure 8:
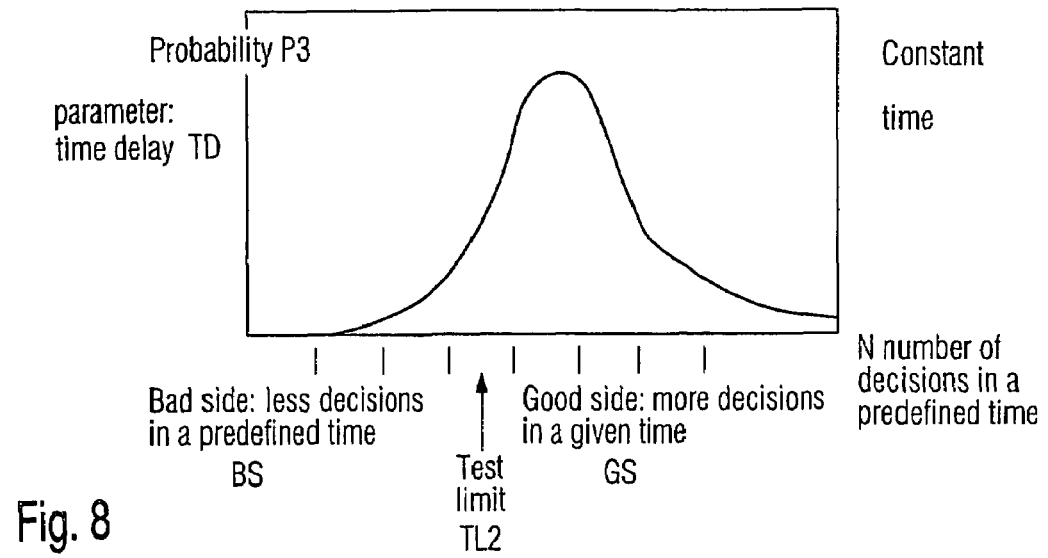
FIG. 8 shows the probability as a function of decisions in a predefined time.

Thus the constant parameter of the distribution is time, i. e. number of DRX cycles. The variable input of the distribution is 1$^{st}$, 2$^{nd}$, ..., N$^{th}$ decision. The output is the probability to find the questioned decision. This probability distribution P3 is illustrated in FIG. 8.

Also this distribution P3 gets relatively narrower with an increasing number of measurements. Due to relative decreasing bandwidth of the distribution P3 with increasing number of delay measurements, the distribution P3 concentrates more and more on one side of the test limit TL2 (in formula (3)). So, the tests have to be continued until 95% of the area of the distribution P3 concentrate on one side of the test limit TL2 and it has to be decided accordingly, as can be seen from FIG. 8.

This strategy gives a decision, if the mean value of distribution P1 is, with 95% confidence level, on the good side GS or bad side BS of test limit TL2. The original task, however, is to decide if the 90/10% value of distribution P1 is, with 95% confidence level, on the good side GS or bad side BS of test limit TL2. This requires a modification of distribution P1 prior to the statistical transformation:

a) evaluate the mean value and the 90/10% value of distribution P1
b) Shift P1, such that the mean value of the sifted distribution P1 hits the 90/10% value of the initial P1 (P1→P1').
c) perform the statistical transformation P1'→P3' and decide against the test limit TL2.

TL2, the limit between the good side GS and the bad side BS in P3 or P3' is:

limit $$N_{TL2} = \frac{\text{Accumulated test time}}{TD_{limit}} \quad (3)$$

$N_{TL2}$ is the limit-number-of decisions, lower numbers of which is the bad side BS and higher numbers of which is the good side GS.

Accumulated test time is the accumulated test time up to the current state.

$TD_{limit}$ is the specified time delay, e.g. 8 s.

The following analogy might help to understand the origin of the statistical transformation. It is known from the binomial distribution, that it can be derived from the following elementary probability distribution:

$$P(ns, p) = p * q^{ns-1} \quad (4)$$

The probability for the occurrence of an event is p, (p=1/6 to toss a "1" with a fair die). The complementary probability is q=1−p. (q=5/6 not to toss a "1" with a fair die). P(ns,p) describes the differential distribution of number of tosses to find the first event, (Number of tosses ns to the first "1"). ns is variable, p is constant.

To find statistically the number of tosses until the ne$^{th}$ event occurs, is answered by the ne−1$^{st}$ self-convolution of (4):

$$P(ns,ne,p) = P(ns)*P(ns)*P(ns)* \ldots P(ne-1 \text{ times}*) \quad (5)$$

\* stands for convolution. ne is a parameter in the set of P(ns,ne,p), describing the number of events (ne<=ns).

Swap of parameter (ne) and variable (ns) and introducing some offset generates exactly a set of binomial distributions $$\text{dbinom(ne−1,ns−1,p)} \quad (6)$$

wherein dbinom is the binomial distribution ns is the number of tosses (parameter) ne is the number of events (to find a "1") (variable) p is the basic probability (constant)

With the same method the exponential distribution can be transformed exactly into a set of Poisson distributions.

This analogy can be exploited to transform the non classical delay distribution P1, shown in FIG. 6, into the final distribution P3, shown in FIG. 8.

| Table of analogy | |
|---|---|
| Transformation P(ns, p) = p * q$^{ns-1}$ → Binomial Distribution | Transformation: Delay distribution → final Distribution |
| P(ns, p) = p * q$^{ns-1}$: Probability to find the first event after 1, 2, ... ns, ... trials | Delay distribution (FIG. 6): Probability to find the first decision after 1, 2 ... seconds |
| Binomial distribution: Probability to find ne events (0 < ne < ns) in ns trials | Final distribution (FIG. 8): Probability to find ne decisions in a time, given by the measurement |
| ne: number of events in repeated trials | ne: number of decisions in repeated measurements |
| ns: number of trials (if the trials are regularly spaced in time, ns represents the time) | ns: number of trials. The number of trials is not measurable outside the User Equipment UE. However, if the trials are regularly, ns represents the time. The time to the decision is measured. |
| p: constant probability (to toss a "1" with a fair die) | Po: time dependent probability (FIG. 5) |

However, in contrast to formula (4), FIG. 6 is regarded as preliminary getting more and more mature during the test by using apriori information and adding more and more delay measurements to the distribution. For pass fail decision it is proposed to use the most mature available delay distribution.

The measurement strategy is as follows

Figure 10:
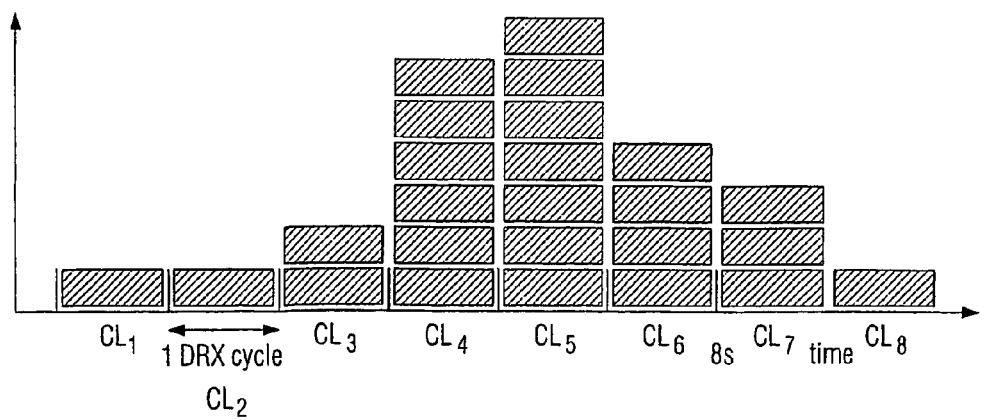
FIG. 10 shows the grouping of delay tests and FIG. 11 shows a block diagram of a filter.

1) Performing a minimum number of delay tests, e. g. 25.
2) Grouping the time delays TD obtained from the general delay tests. All the individual delay tests are grouped into classes CL$_1$ ... CL$_8$ as indicated in FIG. 10. The result is normalised such that the area is 1.
3) The error model is fitted towards the measurement using the free parameters. The best fit criterion is the minimum RMS (Root, Mean, Square)-difference.

4) Shifting the last modelled distribution P1 (mean value→e. g. 90/10% value).
5) The latest model according to the statistical transformation is generated, i. e. the probability distribution P2 shown in FIG. 7 is generated from the probability distribution P1 shown in FIG. 6 by several self convolutions. The probability distribution P3 shown in FIG. 8 is generated from the probability distribution P2 shown in FIG. 7 by swapping constant and variable.
6) If more than a certain percentage, e. g. 95%, of the area of the probability distribution P3 shown in FIG. 8 is on the good side GS of the test limit TL2 with or without a relaxing correction to the test limit TL2 the test is stopped and passed.
7) If more than a certain percentage, e. g. 95%, of the area of the probability distribution P3 shown in FIG. 8 is on the bad side BS of the test limit TL2 without correction the test is stopped and failed.
8) The next delay test is performed and the procedure is set forth with step 2).

This measurement strategy contains the fit process. Fitting the model towards the measurement is a large computational effort following each delay measurement. However, as indicated this introduces a priori knowledge into the test procedure, which need not to be gained by a large amount of measurement repetitions. Consequently this saves test time.

As already indicated the distribution is implementation dependent. Fitting the model towards the measurement regards in a limited scope individual implementations in a standardised test procedure. However, the procedure works successfully just by using the measured distribution. It then reads as follows:
1) Performing a minimum number of delay tests, e. g. 25.
2) Grouping the time delays TD obtained form the general delay tests. All the individual delay tests are grouped into classes $CL_1 \ldots CL_8$ as indicated in FIG. 10. The result is normalised such that the area is 1.
3) Shifting of the latest modelled distribution (mean value→e. g. 90/10% value).
4) The latest measured distribution is transformed according to the statistical transformation, i. e. the probability distribution P2 shown in FIG. 7 is generated from the probability distribution P1 shown in FIG. 6 several self convolutions in the example. The probability distribution P3 shown in FIG. 8 is generated from the probability distribution P2 shown in FIG. 7 by swapping constant and variable.
5) If more than a certain percentage, e. g. 95%, of the area of the probability distribution P4 shown in FIG. 8 is on the good side GS of the test limit TL2 with or without a relaxing correction to the test limit TL2 the test is stopped and passed.
6) If more than a certain percentage, e. g. 95%, of the area of the probability distribution P3 shown in FIG. 8 is on the bad side BS of the test limit TL2 without correction the test is stopped and failed.
7) The next delay test is performed and the procedure is set forth with step 2).

Note that the optional relaxing correction has the following function: With increasing number of measurements the probability distribution P3 concentrates onto one location in FIG. 8. If this location exactly is the only test limit TL, the test will last infinite time. Having two test limits, the original and the relaxed one, ensures that the test comes to an end after a finite test time. This is further described in earlier application PCT/EP02/02252 which is incorporated into this application by reference.

The pass fail decision for the UE based on the exceed-8 s ratio=10% is done after the minimum possible repetitions of delay measurements. The decision quality is restricted by two components: wrong decision probability, based on the latest distribution, and uncertainty about the fidelity of the that distribution.

A User Equipment UE near the test limit needs the longest test time, however it is finite. A very good User Equipment UE is passed very early. A very bad User Equipment UE is failed very early.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method to evaluate whether a statistical time delay (TD) between a first event (CS) and a second event (RM) of a device under test (DUT) is better than a test limit (TL) comprising the steps
   Performing a minimum number N of tests and evaluating the individual time delay (TD) from each test,
   Modeling a first probability distribution (P1) of the evaluated time delays (TD) as a function of the elapsed time from the first occurrence of the first event (CS) to the first occurrence of the second event (RM),
   Obtaining a second probability distribution (P2) of the evaluated time delays (TD) as a function of the elapsed time from the first occurrence of the first event (CS) to the N-th occurrence of the second event (RM) by performing the N-1-th self convolution of the first probability distribution (P1),
   Performing a statistical transformation (ST) in order to obtain a third probability distribution (P3) of the evaluated time delays (TD) as a function of the N-th occurrence of the second event (RM),
   Deciding to pass the device under test (DUT), if a certain percentage of the area of the third probability distribution (P3) is on a good side (GS) of the test limit (TL2), or
   Deciding to fail the device under test (DUT), if a certain percentage of the area of the third probability distribution (P3) is on a bad side (BS) of the test limit (TL2), otherwise
   Repeating the steps of the method with an incremented number N of tests.

2. Method according to claim 1, characterized by grouping the evaluated time delays (TD) from the individual tests into classes (CL) before modeling the first probability distribution (P1).

3. Method according to claim 1 or 2, characterized in that the device under test (DUT) is a user equipment (UE), especially a mobile station, in a cellular mobile communication system and the first event is a cell quality swap (CS) of the cellular mobile communication system.

4. Method according to claim 3, characterized in that the second event is a registration message (RM) issued by the user equipment (UE) in order to register to another cell (Cell 1,; Cell 2) of the cellular mobile communication system as a response to the cell quality swap (CS).

5. Method according to claim 4, characterized by fitting free parameters of an error model (EM) for modeling the first probability distribution (P1).

6. Method according to claim 5, characterized in that a free parameter of the error model (EM) is a random equally distributed delay (S) due to the fact that the cell swap (CS) and the first physical measurement of the user equipment (UE) are uncorrelated.

7. Method according to claim 6, characterized in that a free parameter of the error model (EM) is a constant processing delay (PD) of the user equipment (UE).

8. Method according to claim 7, characterized in that a free parameter of the error model (EM) is the standard deviation ($\sigma$) of a gaussian distribution of additive white gaussian noise.

9. Method according to claim 8, characterized in that a free parameter of the error model (EM) is a parameter (k) of a filter function due to linear distortion in the user equipment (UE).

10. Method according to claim 9, characterized in that the filter function has the form of formula $F_n=(1-a)\cdot F_{n-1}+a\cdot M_n$ whereby $F_n$ is the updated filtered measurement result, $F_{n-1}$ is the old filtered measurement result, $M_n$ is the latest received measurement result and $a=\frac{1}{2}^{(k/2)}$, where k is the free parameter.

11. Method according to claim 9, characterized in that, a free parameter of the error model (EM) is a deviation parameter (L) due to a linearity error.

* * * * *